United States Patent
Janssen et al.

(10) Patent No.: US 12,065,873 B2
(45) Date of Patent: Aug. 20, 2024

(54) SPACER HAVING IMPROVED ADHESION

(71) Applicant: SAINT-GOBAIN GLASS FRANCE, Courbevoie (FR)

(72) Inventors: David Janssen, Tönisvorst (DE); Walter Schreiber, Aachen (DE); Florian Carre, Übach-Palenberg (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/790,887

(22) PCT Filed: Jan. 5, 2021

(86) PCT No.: PCT/EP2021/050048
§ 371 (c)(1),
(2) Date: Jul. 5, 2022

(87) PCT Pub. No.: WO2021/140081
PCT Pub. Date: Jul. 15, 2021

(65) Prior Publication Data
US 2023/0124735 A1    Apr. 20, 2023

(30) Foreign Application Priority Data

Jan. 6, 2020   (EP) ..................................... 20150313

(51) Int. Cl.
*E06B 3/663*    (2006.01)
*B32B 27/08*    (2006.01)
(Continued)

(52) U.S. Cl.
CPC .......... *E06B 3/66352* (2013.01); *B32B 27/08* (2013.01); *B32B 27/32* (2013.01);
(Continued)

(58) Field of Classification Search
CPC . E06B 3/00; E06B 3/66; E06B 3/6612; E06B 3/663; E06B 3/66309;
(Continued)

(56) References Cited

U.S. PATENT DOCUMENTS

2007/0261325 A1* 11/2007 Rosskamp ................ E06B 3/24
                                                        52/204.5
2015/0284987 A1* 10/2015 Lohwasser .............. B32B 37/12
                                                        428/34

(Continued)

FOREIGN PATENT DOCUMENTS

EP    2 719 533 A1    4/2014
EP    3 241 972 A    11/2017
(Continued)

OTHER PUBLICATIONS

International Preliminary Report on Patentability and the Written Opinion of the International Searching Authority as issued in International Patent Application No. PCT/EP2021/050048, dated Jul. 12, 2022.

(Continued)

*Primary Examiner* — Maria V Ewald
*Assistant Examiner* — Ethan A. Utt
(74) *Attorney, Agent, or Firm* — Pillsbury Winthrop Shaw Pittman LLP

(57) ABSTRACT

A spacer includes a polymeric hollow profile, including a first and second side wall, a glazing interior wall connecting the side walls to one another; an outer wall arranged parallel to the glazing interior wall and connects the side walls to one another; a cavity surrounded by the side walls, the glazing interior wall, and the outer wall, a moisture barrier on the first side wall, the outer wall, and the second side wall, wherein the moisture barrier includes a multi-layer system having a barrier function including a polymeric layer and an (Continued)

Figure 1:
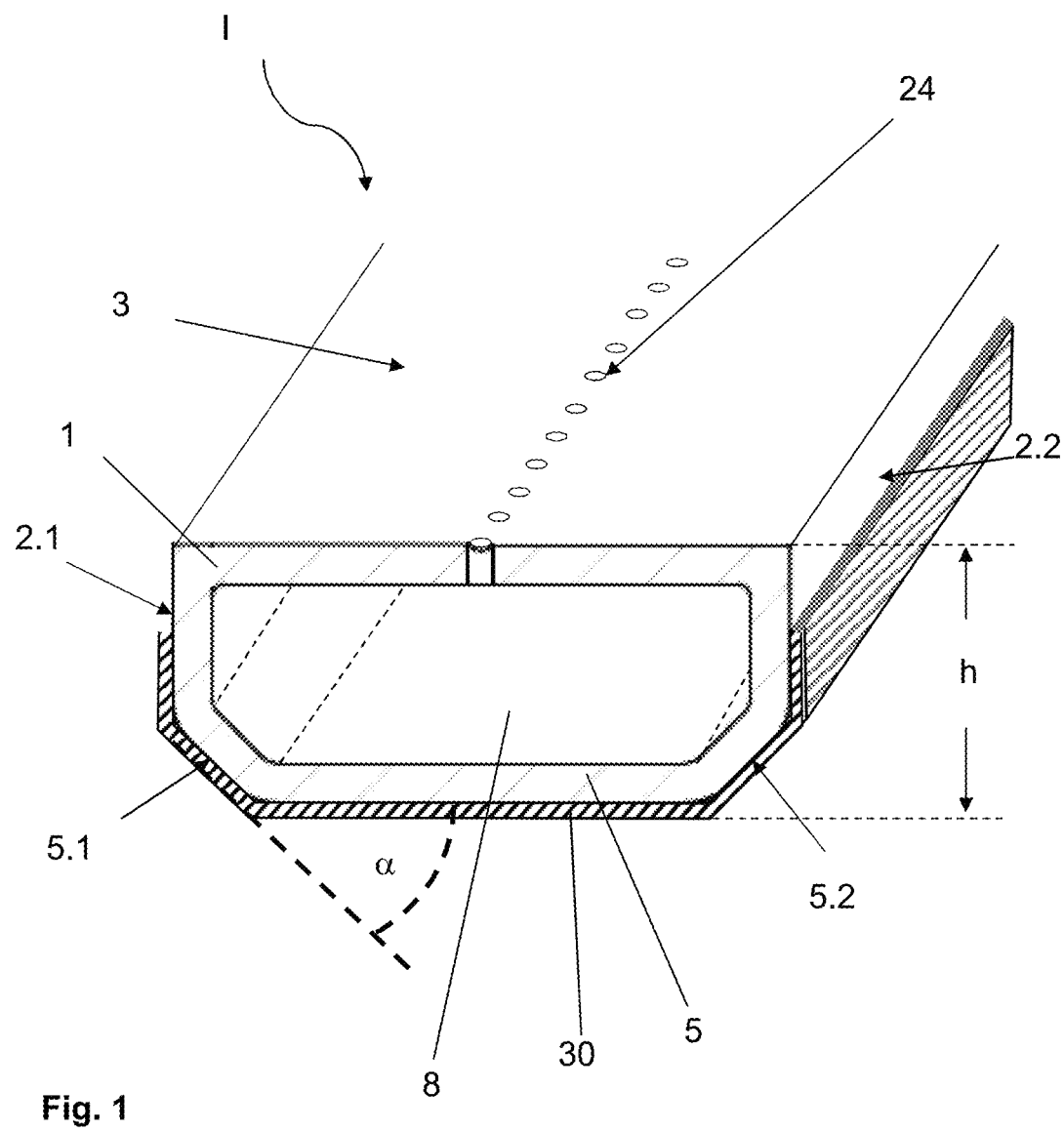

inorganic barrier layer, a metallic or ceramic outer adhesive layer having a thickness of less than 100 nm, a binding layer between the adhesive layer and the multi-layer system and including a polymer selected from oriented propylene, oriented polyethylene terephthalate, biaxially oriented propylene, and biaxially oriented polyethylene terephthalate. The binding layer is directly adjacent the adhesive layer.

23 Claims, 3 Drawing Sheets

(51) Int. Cl.
  *B32B 27/32* (2006.01)
  *B32B 27/36* (2006.01)
  *E06B 3/673* (2006.01)

(52) U.S. Cl.
  CPC .......... *B32B 27/36* (2013.01); *E06B 3/66314* (2013.01); *E06B 3/67321* (2013.01); *B32B 2255/10* (2013.01); *B32B 2255/20* (2013.01); *B32B 2255/205* (2013.01); *B32B 2307/518* (2013.01); *B32B 2307/7265* (2013.01); *B32B 2307/732* (2013.01); *E06B 3/67343* (2013.01)

(58) Field of Classification Search
  CPC ............. E06B 3/66314; E06B 3/66319; E06B 3/66328; E06B 3/66342; E06B 3/66352
  USPC ......... 428/34; 52/204.591, 204.593, 204.595
  See application file for complete search history.

(56) References Cited

U.S. PATENT DOCUMENTS

| | | | |
|---|---|---|---|
| 2017/0298680 A1* | 10/2017 | Schreiber | E06B 3/66333 |
| 2018/0073292 A1* | 3/2018 | Graham | E06B 3/67343 |
| 2018/0298673 A1* | 10/2018 | Runze | E06B 3/66319 |
| 2018/0340365 A1* | 11/2018 | Kuster | E06B 3/66319 |
| 2019/0291387 A1* | 9/2019 | Neander | E06B 3/663 |

FOREIGN PATENT DOCUMENTS

| | | | | |
|---|---|---|---|---|
| EP | 3241972 A1 * | 11/2017 | | |
| EP | 3 505 716 A | 7/2019 | | |
| JP | S60-023838 U | 2/1985 | | |
| JP | 2000-296573 A | 10/2000 | | |
| JP | 2016-068258 A | 5/2016 | | |
| JP | 2017-534779 A | 11/2017 | | |
| JP | 2019-507080 A | 3/2019 | | |
| JP | 2019-507099 A | 3/2019 | | |
| WO | WO 2013/104507 A1 | 7/2013 | | |
| WO | WO 2015/043626 A1 | 4/2015 | | |
| WO | WO 2016/046081 A1 | 3/2016 | | |
| WO | WO 2016/139180 A1 | 9/2016 | | |
| WO | WO-2018028990 A1 * | 2/2018 | ....... | B32B 17/10055 |
| WO | WO 2019/134825 A1 | 7/2019 | | |

OTHER PUBLICATIONS

International Search Report as issued in International Patent Application No. PCT/EP2021/050048, dated Mar. 25, 2021.
Notice of Reasons for Refusal as issued in Japanese Patent Application No. 2022-541846, dated Feb. 21, 2023.
Notice of Preliminary Rejection as issued in Korean Patent Application No. 10-2022-7026604, dated Apr. 5, 2023.

\* cited by examiner

SPACER HAVING IMPROVED ADHESION

CROSS-REFERENCE TO RELATED APPLICATIONS

This application is the U.S. National Stage of PCT/EP2021/050048, filed Jan. 5, 2021, which in turn claims priority to European patent application number 20 150 313.3 filed Jan. 6, 2020. The content of these applications are incorporated herein by reference in their entireties.

The invention relates to a spacer for insulating glass units, an insulating glass unit, and use thereof.

Insulating glazings usually contain at least two panes made of glass or polymeric materials. The panes are separated from one another via a gas or vacuum space defined by the spacer. The thermal insulation capacity of insulating glass is significantly greater than that of single-plane glass and can be even further increased and improved in triple glazings or with special coatings. Thus, for example, silver-containing coatings enable reduced transmittance of infrared radiation and thus reduce the cooling of a building in the winter.

In addition to the nature and the structure of the glass, the other components of an insulated glass unit are also of great significance. The seal and especially the spacer have a major influence on the quality of the insulating glazing. In an insulating glazing, a circumferential spacer is fixed between two glass panes such that a gas-filled or air-filled inner interpane space is created, which is sealed against the penetration of moisture.

The thermal insulating properties of insulating glazings are quite substantially influenced by the thermal conductivity in the region of the edge seal, in particular of the spacer. In the case of metallic spacers, the high thermal conductivity of the metal causes the formation of a thermal bridge at the edge of the glass. This thermal bridge leads, on the one hand, to heat losses in the edge region of the insulating glazing and, on the other, with high humidity and low outside temperatures, to the formation of condensation on the inner pane in the region of the spacer. To solve these problems, thermally optimized so-called "warm edge" systems in which the spacers are made of materials with lower thermal conductivity, in particular plastics, are increasingly used.

The connection between the pane and the spacer is created by an adhesive bond made of a so-called "primary sealant", for example, polyisobutylene. In the event of a failure of this adhesive bond, this is an entry point for moisture. On the outward facing side of the spacer in the outer interpane space, a secondary sealant is usually applied as edge sealing that absorbs mechanical stress caused by climatic loads and thus ensures the stability of the insulating glazing. The outer face of the spacer must be designed such that good adhesion to the secondary sealant is ensured. Due to temperature changes over time, for example, due to solar radiation, the individual components of the insulating glazing expand and contract again when they cool down. The glass expands more than the spacer made of a polymeric material. Consequently, this mechanical movement stretches or compresses the adhesive bond and the edge seal, which can only compensate for these movements to a limited extent based on their own elasticity. Over the course of the service life of the insulating glazing, the mechanical stress described can mean a partial or complete areal detachment of an adhesive bond. This detachment of the bond between the sealant and the spacer can enable penetration of humidity into the insulating glazing, resulting in fogging in the region of the panes and a decrease in the insulating effect. The sides of the spacer that make contact with a sealant should, consequently, have the best possible adhesion to the sealant. One approach to the improvement of the adhesion to the sealant is to adjust the properties of a vapor barrier film arranged on the outside surface of the spacer.

Document EP2719533 A1 discloses for this a spacer with a film that has a thin adhesive layer of SiOx or AlOy on the side facing the secondary sealant. Apart from the thin adhesive layer, the film contains only polymeric layers, which also perform the moisture-sealing function. Among others, oriented EVOH layers serve as a barrier layer against moisture.

Document WO2019134825 A1 discloses a film for a spacer that has an outer adhesive layer in the form of an organic primer.

Document WO2015043626 A1 discloses a film for a spacer with an outer SiOx layer as a primer for adhesives and sealants. Further disclosed is an inner layer of oriented polypropylene that can be welded to the main body.

In addition to the optimized adhesion to the secondary sealant described in the prior art, the adhesion of the film applied to the spacer and the internal stability of the film are also of great importance. For high long-term stability of a spacer in an insulating glazing, both the adhesion to the secondary sealant and the primary sealant must be high, and the film itself must be stable over the long term.

It is, consequently, the object of the present invention to provide an improved spacer that does not have the above-mentioned disadvantages and to provide an improved insulating glass unit.

The object of the present invention is accomplished according to the invention by a spacer for insulating glass units according to the independent claim 1. Preferred embodiments of the invention emerge from the subclaims.

An insulating glass unit according to the invention and its use according to the invention emerge from further independent claims.

The spacer for insulating glass units according to the invention comprises at least a polymeric hollow profile having a first side wall, a second side wall arranged parallel thereto, a glazing interior wall, an outer wall, and a cavity. The cavity is surrounded by the side walls, the glazing interior wall, and the outer wall. The glazing interior wall is arranged substantially perpendicular to the side walls and connects the first side wall to the second side wall. The side walls are the walls of the hollow profile to which the outer panes of the insulating glass unit are attached. The glazing interior wall is the wall of the hollow profile that faces the inner interpane space after installation in the finished insulating glass unit. The outer wall is arranged substantially parallel to the glazing interior wall and connects the first side wall to the second side wall. The outer wall faces the outer interpane space after installation in the finished insulating glass unit.

The spacer further comprises a moisture barrier on the outer wall, the first side wall, and the second side wall of the polymeric hollow profile. The moisture barrier seals the inner interpane space against the penetration of moisture and prevents the loss of a gas contained in the inner interpane space. The moisture barrier has the form of a film with multiple layers and comprises a multi-layer system having a barrier function. This multi-layer system includes at least one polymeric layer and one inorganic barrier layer. The multi-layer system performs the barrier function of the moisture barrier and prevents the penetration of moisture into the inner interpane space. In addition, the moisture barrier includes a metallic or a ceramic outer adhesive layer having a thickness of less than 100 nm. The outer adhesive layer faces in the direction of the external interpane space and is in contact with the secondary sealant in the finished insulating glass unit. The adhesive layer serves in particular to improve adhesion to the secondary sealant. According to the invention, a binding layer made substantially of a polymer selected from the group comprising oriented propylene (oPP), oriented polyethylene terephthalate (oPET), biaxially oriented propylene (boPP), and biaxially oriented polyethylene terephthalate (boPET) is arranged between the adhesive layer and the multi-layer system. The binding layer is directly adjacent the adhesive layer, i.e., no further polymeric layer or adhesive layer is situated between the binding layer and the adhesive layer, but, instead, the two layers are in direct contact. The binding layer improves the binding of the adhesive layer to the multi-layer system such that not only the adhesion to the secondary sealant is improved, but, at the same time, the internal stability of the entire moisture barrier is also improved. In addition, the binding layer improves the mechanical stability of the moisture barrier, in particular during stretching of the film. Thus, the long-term stability of the spacer is further improved compared to the prior art.

In a preferred embodiment, the adhesive layer is a ceramic adhesive layer and includes SiOx or is made of SiOx. SiOx has particularly good adhesion to the materials of the secondary sealant and has low thermal conductivity, which further improves the thermal insulating properties of the spacer. Preferably, SiOx with x between 0.7 and 2.1, preferably between 1 and 1.5 is used.

In another preferred embodiment, the adhesive layer is a metallic adhesive layer. According to the invention, a metallic adhesive layer can comprise both pure metal as well as oxides thereof and alloys thereof. The metallic adhesive layer preferably includes or is made of aluminum, titanium, nickel, chromium, iron, or alloys or oxides thereof. These have good adhesion to the adjacent sealant. Preferred alloys are stainless-steel and TiNiCr.

Particularly preferably, the metallic adhesive layer includes or is made of an oxide of aluminum, titanium, nickel, chromium, iron. The metal oxides are characterized by particularly good adhesion to the adjacent sealant and are particularly stable over the long term. Surprisingly good results in terms of long-term stability have been achieved with a metallic adhesive layer of chromium oxide or titanium oxide.

In a preferred embodiment, the metallic or ceramic adhesive layer is applied directly onto the binding layer by means of chemical vapor deposition (CVD) or physical vapor deposition (PVD). Particularly good adhesion between the binding layer and the adhesive layer is thus achieved.

In a preferred embodiment, the metallic or ceramic adhesive layer has a thickness between 5 nm and 70 nm, preferably between 10 nm and 50 nm. In this range, the adhesive layer contributes little to the conduction of heat through the spacer and is sufficiently thick to ensure good adhesion to the secondary sealant. Particularly preferably, the adhesive layer has a thickness between 20 nm and 30 nm. In this range, good adhesion is ensured and, at the same time, material costs for the adhesive layer are advantageously low.

In a preferred embodiment, the binding layer is made from a polymer selected from the group of oriented polypropylene (oPP), oriented polyethylene terephthalate (oPET), biaxially oriented polypropylene (boPP), and biaxially oriented polyethylene terephthalate (boPET). These polymers ensure particularly good adhesion to the adjacent adhesive layer and the adjacent multi-layer system. Oriented polypropylene and oriented polyethylene terephthalate are unidirectionally stretched films. Films made of boPP and boPET are stretched longitudinally and transversely. Stretching makes the films more resistant than the original films. These films are particularly stable and have increased impermeability to water vapor. Particularly preferably, the binding layer is made of boPP or boPET, since they provide the best results in terms of long-term stability and, at the same time, advantageously reduce the water-vapor permeability of the moisture barrier.

In a preferred embodiment, the binding layer has a thickness of 8 µm to 30 µm, particularly preferably a thickness of 12 µm to 25 µm. In these thickness ranges, stability during stretching of the film is particularly high such that the long-term stability of the spacer is increased.

In a preferred embodiment, the multi-layer system having a barrier function includes at least two polymeric layers and at least two inorganic barrier layers. The inorganic barrier layers contribute significantly to the barrier function of the multi-layer system. The polymeric layers serve, on the one hand, as a carrier material and as intermediate layers between the inorganic barrier layers. On the other hand, the polymeric layers can also make a significant contribution to the barrier function. In particular, oriented polymeric films improve the tightness of the spacer.

In a preferred embodiment, the multi-layer system having a barrier function includes exactly two polymeric layers and three inorganic barrier layers. A third inorganic barrier layer further improves the barrier effect of the moisture barrier.

In a preferred embodiment, the multi-layer system includes at least three polymeric layers and at least three inorganic barrier layers. In another preferred embodiment, the multi-layer system having a barrier function includes exactly three polymeric layers and exactly three inorganic barrier layers. Such a moisture barrier can be readily fabricated from three singly-coated films.

In a preferred embodiment, individual layers of the multi-layer system are arranged to form a layer stack with the following layer sequence: inorganic barrier layer/polymeric layer/inorganic barrier layer. Depending on the manufacturing method, the layers can be connected directly or can be connected by a bonding layer arranged therebetween. The internal stability of the moisture barrier is improved by arranging a polymeric layer between two inorganic barrier layers, since detachment of individual layers occurs less frequently than with an arrangement in which all the inorganic barrier layers are arranged adjacent one another.

In a preferred embodiment, an inorganic barrier layer of the multi-layer system is arranged directly adjacent the binding layer. In other words, this inorganic barrier layer is arranged on the binding layer without an interposed polymeric layer or bonding layer. This is advantageous for the stability of the overall system and is particularly simple to manufacture.

In a preferred embodiment, the layer sequence in the moisture barrier is as follows: outer adhesive layer/binding layer/inorganic barrier layer/bonding layer/polymeric layer/inorganic barrier layer. This film structure is particularly stable and is characterized by good moisture sealing. Production is preferably done by laminating a film comprising outer adhesive layer, binding layer, and inorganic barrier layer with a film comprising a polymeric layer and an inorganic barrier layer.

Particularly preferably, the layer sequence in the moisture barrier is as follows: outer adhesive layer/binding layer/inorganic barrier layer/bonding layer/polymeric layer/inorganic barrier layer/bonding layer/inorganic barrier layer/ polymeric layer. The tightness of the film is further improved by laminating an additional film comprising a polymeric layer and an inorganic barrier layer. By arranging the inorganic barrier layer inward, i.e., not facing the spacer, the inorganic barrier layer is protected by the polymeric layer facing outward toward the spacer.

Alternatively, the additional film composed of a polymeric layer and an inorganic barrier layer is preferably laminated such that the following layer sequence in the moisture barrier results: outer adhesive layer/binding layer/ inorganic barrier layer/bonding layer/polymeric layer/inorganic barrier layer/bonding layer/polymeric layer/inorganic barrier layer. In this case, an inorganic barrier layer faces the outer wall of the spacer and is bonded thereto.

Each of the above-mentioned preferred embodiments can be combined with further layers on the side facing the spacer. Thus, the tightness can be further improved; however, the material costs increase.

A polymeric layer of the multi-layer system preferably includes polyethylene terephthalate, ethylene vinyl alcohol, oriented ethylene vinyl alcohol, polyvinylidene chloride, polyamides, polyethylene, polypropylene, oriented polypropylene, biaxially oriented polypropylene, oriented polyethylene terephthalate, biaxially oriented polyethylene terephthalate or is made of one of the polymers mentioned.

A polymeric layer preferably has a thickness of 5 µm to 24 µm, preferably of 10 µm to 15 µm, particularly preferably of 12 µm. These thicknesses result in a multi-layer system that is particularly stable overall.

A bonding layer for bonding coated or uncoated films to form a multi-layer system preferably has a thickness of 1 µm to 8 µm, preferably of 2 µm to 6 µm. This ensures secure bonding.

An inorganic barrier layer of the multi-layer system is preferably a metallic or a ceramic barrier layer. The thickness of an individual inorganic barrier layer is preferably in the range from 20 nm to 300 nm, particularly preferably in the range from 30 nm to 100 nm.

A metallic barrier layer preferably contains or is made of metals, metal oxides, or alloys thereof. Preferably, the metallic barrier layer contains or is made of aluminum, silver, copper, their oxides or alloys. These barrier layers are characterized by particularly high tightness.

A ceramic barrier layer preferably includes or is made of a silicon oxide and/or a silicon nitride. These layers have better thermal insulating properties than metallic barrier layers and can also be implemented transparent.

In a preferred embodiment, the multi-layer system having a barrier function includes exclusively metallic barrier layers as inorganic barrier layers. This improves the long-term stability of the spacer, since thermal stresses due to different materials within the moisture barrier are better compensated than when different barrier layers are combined. Most particularly preferably, the multi-layer system having a barrier function includes exclusively aluminum layers as metallic barrier layers. Aluminum layers have particularly good sealing properties and are readily processable.

In another preferred embodiment, the multi-layer system having a barrier function includes exclusively ceramic barrier layers made of SiOx or SiN as inorganic barrier layers. Such a moisture barrier is characterized by particularly good thermal insulating properties. Particularly preferably, the outer adhesive layer is made of SiOx. Such a moisture barrier can be particularly well implemented as a transparent film.

In another preferred embodiment, the multi-layer system includes both one or more ceramic barrier layers and one or more metallic barrier layers. By combining the different barrier layers and their different properties, an optimal seal against the penetration of moisture and also against the loss of a gas filling from the inner interpane space can be achieved.

The moisture barrier is preferably arranged continuously in the longitudinal direction of the spacer, so no moisture can enter the inner interpane space in the insulating glazing along the entire circumferential spacer frame.

The moisture barrier is preferably applied such that the regions of the two side walls bordering on the glazing interior wall are free of a moisture barrier. A particularly good seal of the spacer is achieved by attaching it to the entire outer wall up to the side walls. The advantage of the regions on the side walls remaining free of the moisture barrier resides in an improvement of the visual appearance in the installed state. In the case of a moisture barrier adjacent the glazing interior wall, this becomes visible in the finished insulating glass unit. This is sometimes perceived as aesthetically unattractive. Preferably, the height of the region remaining free of the moisture barrier is between 1 mm and 3 mm. In this embodiment, the moisture barrier is not visible in the finished insulating glass unit.

In an alternative preferred embodiment, the moisture barrier is attached over the entire side walls. Optionally, the moisture barrier can also be arranged on the glazing interior wall. This further improves the sealing of the spacer.

The cavity of the spacer according to the invention results in a weight reduction compared to a solidly formed spacer and is available for accommodating further components, such as a desiccant.

The first side wall and the second side wall are the sides of the spacer on which the outer panes of an insulating glass unit are mounted when the spacer is installed. The first side wall and the second side wall are parallel to one another.

The outer wall of the hollow profile is the wall opposite the glazing interior wall, which faces away from the interior of the insulating glass unit (inner interpane space) toward the outer interpane space. The outer wall is preferably substantially perpendicular to the side walls. A planar outer wall that is perpendicular to the side walls in its entire course (parallel to the glazing interior wall) has the advantage that the sealing surface between the spacer and the side walls is maximized and a simpler shape facilitates the production process.

In a preferred embodiment of the spacer according to the invention, the sections of the outer wall nearest the side walls are inclined toward the side walls at an angle α (alpha) of 30° to 60° relative to the outer wall. This design improves the stability of the polymeric hollow profile. Preferably, the sections nearest the side walls are inclined at an angle α (alpha) of 45°. In this case, the stability of the spacer is further improved. The angled arrangement improves the bonding of the moisture barrier.

In a preferred embodiment, the moisture barrier is glued onto the polymeric hollow profile using a non-gassing adhesive. The difference in linear expansion between the moisture barrier and the polymeric main body can lead to thermal stresses. As a result of attaching the moisture barrier using adhesive, stresses can, if necessary, be absorbed by the elasticity of the adhesive. Suitable adhesives include thermoplastic adhesives, but also reactive adhesives, such as multicomponent adhesives. Preferably, a thermoplastic polyurethane or a polymethacrylate is used as the adhesive. This has proved particularly suitable in tests.

In a preferred embodiment of the spacer according to the invention, the polymeric hollow profile has a substantially uniform wall thickness d. The wall thickness d is preferably in the range from 0.5 mm to 2 mm. In this range, the spacer is particularly stable.

In a preferred embodiment of the spacer according to the invention, the hollow profile contains bio-based polymers, polyethylene (PE), polycarbonates (PC), polypropylene (PP), polystyrene, polyesters, polyethylene terephthalate (PET), polyethylene terephthalate glycol (PET-G), polyoxymethylene (POM), polyamides, polyamide-6,6, polybutylene terephthalate (PBT), acrylonitrile-butadiene-styrene (ABS), acrylonitrile-styrene acrylester (ASA), acrylonitrile-butadiene-styrene-polycarbonate (ABS/PC), styrene acrylonitrile (SAN), PET/PC, PBT/PC, or copolymers thereof. In a particularly preferred embodiment, the hollow profile is substantially made of one of the polymers listed.

The polymeric hollow profile is preferably glass-fiber-reinforced. The coefficient of thermal expansion of the polymeric hollow profile can be varied and adjusted by the selection of the glass fiber content in the polymeric hollow profile. By adjusting the coefficient of thermal expansion of the hollow profile and of the moisture barrier, temperature-induced stresses between the different materials and spalling of the moisture barrier can be prevented. The polymeric hollow profile preferably has a glass fiber content of 20 wt.-% to 50 wt.-%, particularly preferably of 30 wt.-% to 40 wt.-%. The glass fiber content in the polymeric hollow profile improves strength and stability at the same time. Glass-fiber-reinforced spacers are generally rigid spacers that are snapped together or welded at the time of assembly of a spacer frame for an insulating glass unit from individual straight pieces. The connection points have to be sealed separately with a sealant to ensure optimum sealing of a spacer frame. The spacer according to the invention can be processed particularly well due to the high stability of the moisture barrier and the particularly good adhesion to the sealant.

In an alternative preferred embodiment, the hollow profile does not contain glass fibers. The presence of glass fibers degrades the thermal insulating properties of the spacer and makes the spacer rigid and brittle. Hollow profiles without glass fibers can be bent better, eliminating the need to seal the connection points. During bending, the spacer is subjected to special mechanical loads. In particular, in the corners of a spacer frame, the moisture barrier is greatly stretched. The structure according to the invention of the spacer having a moisture barrier also enables bending of the spacer without adversely affecting the sealing of the insulating glass unit.

In another preferred embodiment, the polymeric hollow profile is made from a foamed polymer. In this case, a foaming agent is added during manufacture of the polymeric hollow profile. Examples of foamed spacers are disclosed in WO2016139180 A1. The foamed design results in reduced conduction of heat through the polymeric hollow profile and in material and weight savings compared to a solid polymeric hollow profile.

In a preferred embodiment, the glazing interior wall has at least one perforation. Preferably, multiple perforations are made in the glazing interior wall. The total number of perforations depends on the size of the insulating glass unit. The perforations in the glazing interior wall connect the cavity to the inner interpane space of an insulating glass unit, making a gas exchange between them possible. This permits absorption of atmospheric moisture by a desiccant situated in the cavity, thus preventing fogging of the panes. The perforations are preferably implemented as slits, particularly preferably as slits with a width of 0.2 mm and a length of 2 mm. The slits ensure optimum air exchange without desiccant from the cavity being able to penetrate into the inner interpane space. The perforations can be simply punched or drilled into the glazing interior wall after production of the hollow profile. Preferably, the perforations are hot punched into the glazing interior wall.

In an alternative preferred embodiment, the material of the glazing interior wall is porous or made with a plastic open to diffusion such that perforations are not required.

The polymeric hollow profile preferably has a width along the glazing interior wall of 5 mm to 55 mm, preferably of 10 mm to 20 mm. In the context of the invention, the width is the dimension extending between the side walls. The width is the distance between the surfaces of the two side walls facing away from one another. The selection of the width of the glazing interior wall determines the distance between the panes of the insulating glass unit. The exact dimension of the glazing interior wall is governed by the dimensions of the insulating glass unit and the desired size of the interpane space.

The hollow profile preferably has, along the side walls, a height of 5 mm to 15 mm, particularly preferably of 6 mm to 10 mm. In this range for the height, the spacer has advantageous stability, but is, on the other hand, advantageously inconspicuous in the insulating glass unit. In addition, the cavity of the spacer has an advantageous size for accommodating a suitable amount of desiccant. The height of the spacer is the distance between the surfaces of the outer wall and the glazing interior wall facing away from one another.

The cavity preferably contains a desiccant, preferably silica gels, molecular sieves, $CaCl_2$), $Na_2SO_4$, activated carbon, silicates, bentonites, zeolites, and/or mixtures thereof.

The invention further includes an insulating glass unit with at least a first pane, a second pane, a spacer according to the invention arranged circumferentially between the first and the second pane, an inner interpane space, and an outer interpane space. The spacer according to the invention is arranged to form a circumferential spacer frame. The first pane is attached to the first side wall of the spacer via a primary sealant, and the second pane is attached to the second side wall via a primary sealant. This means that a primary sealant is arranged between the first side wall and the first pane as well as between the second side wall and the second pane. The first pane and the second pane are arranged parallel and preferably congruently. The edges of the two panes are therefore arranged flush in the edge region, i.e., they are at the same height. The inner interpane space is delimited by the first and second pane and the glazing interior wall. The outer interpane space is defined as the space that is delimited by the first pane, the second pane, and the moisture barrier on the outer wall of the spacer. The outer interpane space is at least partially filled with a secondary sealant, with the secondary sealant making direct contact with the outer adhesive layer. The secondary sealant contributes to the mechanical stability of the insulating glass unit and absorbs part of the climatic loads that act on the edge seal.

In a preferred embodiment of the insulating glass unit according to the invention, the primary sealant covers the transition between the polymeric hollow profile and the moisture barrier such that a particularly good sealing of the insulating glass unit is achieved. In this manner, the diffusion of moisture into the cavity of the spacer at the place where the moisture barrier is adjacent the plastic is reduced (less interfacial diffusion).

In another preferred embodiment of the insulating glass unit according to the invention, the secondary sealant is applied along the first pane and the second pane such that a central region of the outer wall is free of secondary sealant. The "central region" refers to the region arranged centrally relative to the two outer panes, in contrast to the two outer regions of the outer wall that are adjacent the first pane and the second pane. In this manner, good stabilization of the insulating glass unit is obtained, while, at the same time, material costs for the secondary sealant are saved. At the same time, this arrangement can be easily produced by applying two strands of secondary sealant on the outer wall in the outer region adjacent the outer panes in each case.

In another preferred embodiment, the secondary sealant is attached such that the entire outer interpane space is completely filled with secondary sealant. This results in maximum stabilization of the insulating glass unit.

Preferably, the secondary sealant contains polymers or silane-modified polymers, particularly preferably organic polysulfides, silicones, hot melts, polyurethanes, room-temperature-vulcanizing (RTV) silicone rubber, peroxide-vulcanizing silicone rubber, and/or addition-vulcanizing silicone rubber. These sealants have a particularly good stabilizing effect. With the spacer according to the invention, thanks to the adhesive layer, excellent adhesion results were achieved for the entire spectrum of customary secondary sealants.

The primary sealant preferably contains a polyisobutylene. The polyisobutylene can be a cross-linking or non-cross-linking polyisobutylene.

The first pane and the second pane of the insulating glass unit preferably contain glass, ceramic, and/or polymers, particularly preferably quartz glass, borosilicate glass, soda lime glass, polymethyl methacrylate, or polycarbonate.

The first pane and the second pane have a thickness of 2 mm to 50 mm, preferably 3 mm to 16 mm, with the two panes possibly even having different thicknesses.

In a preferred embodiment of the insulating glass unit according to the invention, the spacer frame consists of one or a plurality of spacers according to the invention. For example, it can be one spacer according to the invention that is bent to form a complete frame. It can also be a plurality of spacers according to the invention that are linked to one another via one or more plug connectors. The plug connectors can be implemented as linear connectors or corner connectors. Such corner connectors can, for example, be implemented as plastic molded parts with a seal, in which two mitered spacers abut.

In principle, a wide variety of geometries of the insulating glass unit are possible, for example, rectangular, trapezoidal, and rounded shapes. To produce round geometries, the spacer according to the invention can, for example, be bent in the heated state.

In another embodiment, the insulating glazing includes more than two panes. In this case, the spacer can include grooves in which at least one additional pane is arranged. Multiple panes could also be laminated glass panes.

The invention further includes the use of the insulating glass unit according to the invention as building interior glazing, building exterior glazing, and/or façade glazing.

EXAMPLES

The spacer according to the invention is improved compared to the known spacers in terms of long-term stability. For testing purposes, spacers according to the invention were subjected to adhesion tests, carried out before and after aging tests in each case. For an aging tests, spacers with a polymeric hollow profile made of styrene acrylonitrile with about 35 wt.-% glass fiber were coated with a strip of secondary sealant in the form of a polysulfide and stored for 2 weeks at 58° C. and relative humidity of more than 95%. These conditions are intended to simulate 20 years of use in an insulating glass unit. Then, the coated spaces were subjected to a tensile test according to EN1279. After 10 minutes, the tensile force was increased until a fracture occurred between the spacer and the sealant, or detachment of the film was observed.

Detachment of the sealant from the moisture barrier applied to the spacer is undesirable. Such a fracture pattern indicates that premature failure will occur in an insulating glazing with such a spacer, since the mechanical stress associated with climate loads will cause detachment of the sealant from the spacer. When, on the other hand, a fracture occurs in the region of the sealant during the test, the use of such a spacer results in an insulating glazing with improved long-term stability. Such a fracture pattern is referred to as a "cohesive fracture". The fracture in the sealant can occur at a location relatively far from the spacer as well as near the sealant/moisture barrier interface. The sealant used was a polysulfide that is commercially available under the brand name Thiover®.

TABLE 1

| | Layer sequence: Adhesive layer 31/Binding layer 32/Multi--layer system having a barrier function 33 | Fracture pattern after aging test |
|---|---|---|
| Example | CrOx 30 nm/oPP 19 μm/Al 50 nm/PET 12 μm/Al 50 nm/PET 12 μm/Al 50 nm/LLDPE 12 μm | >80% cohesive fracture |
| Comparative example | SiOx 30 nm/PET 12 μm/Al 50 nm/PET 12 μm/Al 50 nm/PET 12 μm/Al 50 nm/LLDPE 12 μm | 0% cohesive fracture |

Table 1 shows a structure of an example according to the invention with an adhesive layer of 30-mm-thick chromium oxide and a binding layer of 19-μm-thick oPP. This is followed by a barrier block consisting of three aluminum layers, two PET layers, and an LLDPE (linear low density polyethylene) layer. In the test, a cohesive fracture, i.e., a fracture in the region of the secondary sealant was observed in more than 80%. This suggests that the use of such a spacer results in a particularly long-term stable insulating glazing.

The comparative example is made up of an outer SiOx layer, which serves to improve adhesion, and a barrier system. For this structure, no cohesive fracture was observed in any case. Instead, either destruction of the film, i.e., a fracture within the moisture barrier, occurred; or detachment of the secondary sealant from the moisture layer was observed. This shows that an insulating glazing with a spacer without a structure according to the invention having a binding layer and an adhesive layer is susceptible to failure in the region of the edge seal.

Figure 2:
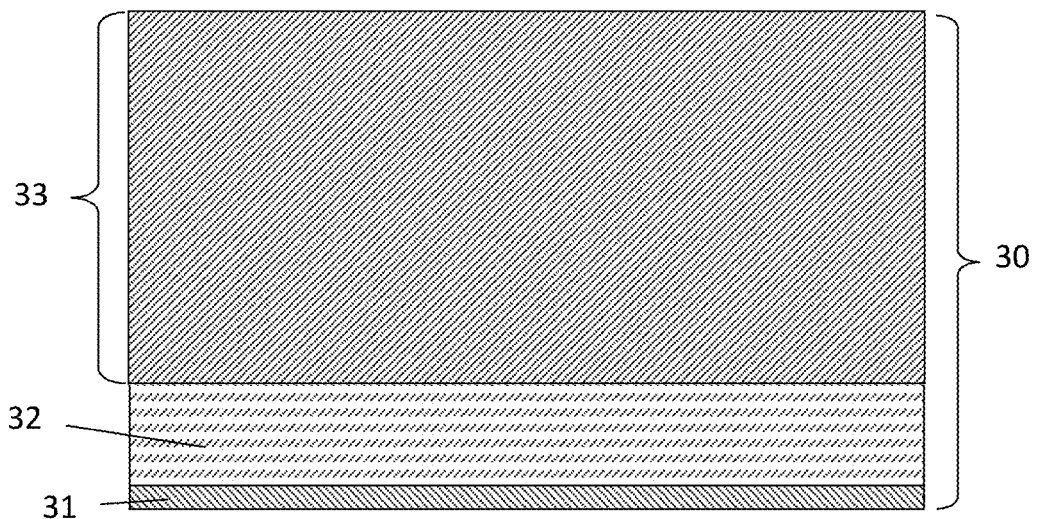
Figure 3:
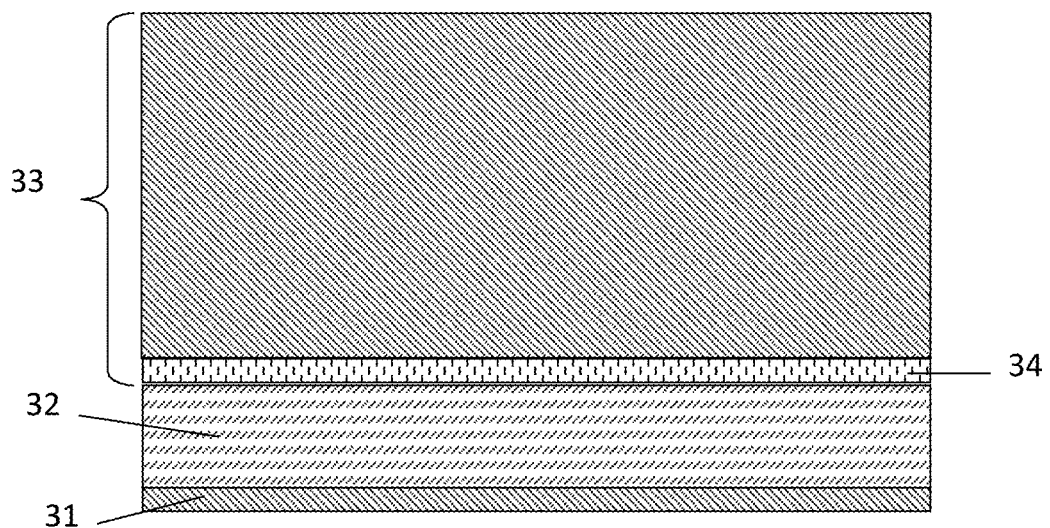
Figure 4:
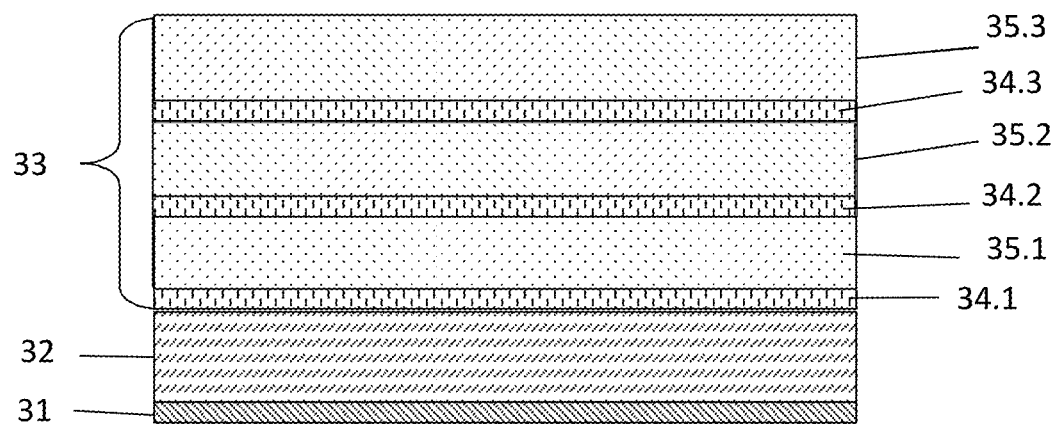
Figure 5:
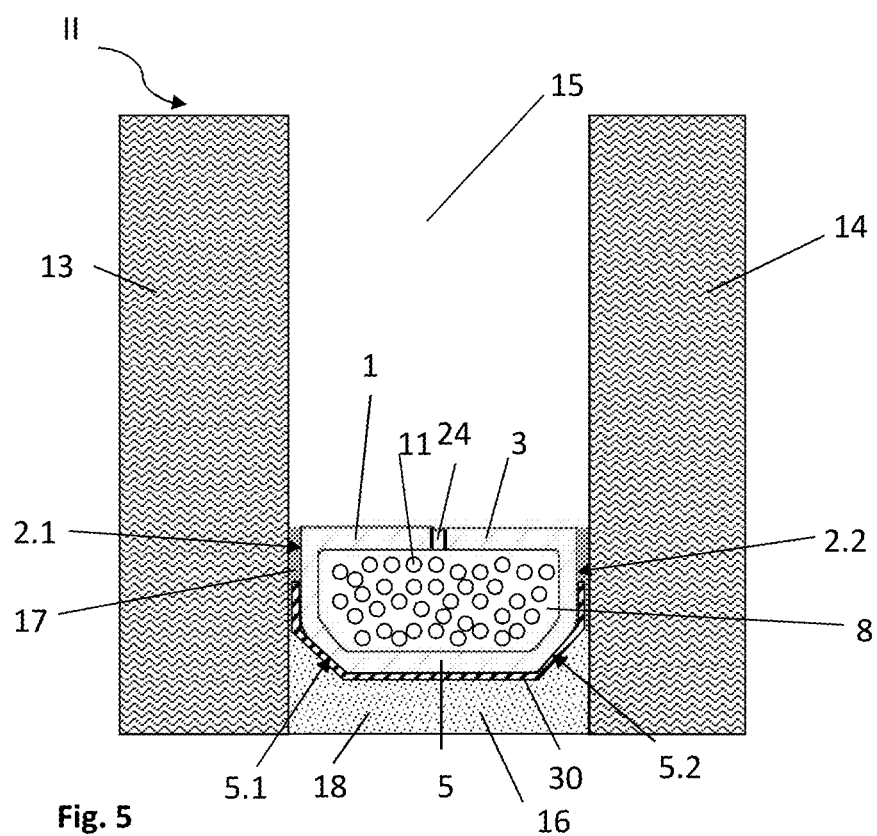

In the following, the invention is explained in detail with reference to drawings. The drawings are purely schematic representations and are not to scale. They in no way restrict the invention. They depict:

FIG. 1 a cross-section of a possible embodiment of a spacer according to the invention, FIG. 2 a cross-section of a possible embodiment of a moisture barrier of a spacer according to the invention, FIG. 3 a cross-section of a possible embodiment of a moisture barrier of a spacer according to the invention, FIG. 4 a cross-section of a possible embodiment of a moisture barrier of a spacer according to the invention, FIG. 5 a cross-section of a possible embodiment of an insulating glass unit according to the invention.

FIG. 1 depicts a cross-section through a possible spacer I according to the invention. The spacer comprises a polymeric hollow profile 1 with a first side wall 2.1, a side wall 2.2 running parallel thereto, a glazing interior wall 3, and an outer wall 5. The glazing interior wall 3 is perpendicular to the side walls 2.1 and 2.2 and connects the two side walls. The outer wall 5 is opposite the glazing interior wall 3 and connects the two side walls 2.1 and 2.2. The outer wall 5 is substantially perpendicular to the side walls 2.1 and 2.2. However, the sections 5.1 and 5.2 of the outer wall 5 nearest side walls 2.1 and 2.2 are inclined at an angle α (alpha) of approx. 45° relative to the outer wall 5 in the direction of the side walls 2.1 and 2.2. The angle geometry improves the stability of the hollow profile 1 and enables better bonding with a moisture barrier 30. The hollow profile 1 is a polymeric hollow profile, made substantially of polypropylene with 20 wt.-% glass fibers. The wall thickness of the hollow profile is 1 mm. The wall thickness is substantially the same everywhere. This improves the stability of the hollow profile and simplifies its manufacture. The hollow profile 1 has, for example, a height h of 6.5 mm and a width of 15.5 mm. The outer wall 5, the glazing interior wall 3, and the two side walls 2.1 and 2.2 enclose the cavity 8. A gas-tight and moisture-tight moisture barrier 30 is arranged on the outer wall 5 and a part of the first side wall 2.1 and a part of the second side wall 2.2. The regions of the first side wall 2.1 and the second side wall 2.2 adjacent the glazing interior wall 3 remain free of moisture barrier 30. Measured from the glazing interior wall 3, this is a 1.9-mm-wide strip that remains free. The moisture barrier 30 can, for example, be attached to the polymeric hollow profile 1 with a polymethacrylate adhesive. The embodiments depicted in FIG. 2 through 4 are, for example, suitable as a moisture barrier 30. The cavity 8 can accommodate a desiccant 11. Perforations that establish a connection to the inner interpane space in the insulating glass unit are made in the glazing interior wall 3. The desiccant 11 can then absorb moisture from the inner interpane space 6.5 via the perforations 24 in the glazing interior wall 3 (see FIG. 5).

FIG. 2 depicts a cross-section through a moisture barrier 30 of a spacer I according to the invention. The moisture barrier 30 comprises an outer adhesive layer 31 of chromium oxide. Here, "outer" means that the adhesive layer 31 faces the external environment and is exposed. In the finished insulating glass unit, the adhesive layer 31 faces the outer interpane space and is in direct contact with the secondary sealant. The chromiumoxid layer has particularly good adhesion to the material of the secondary sealant. A roughly 20-μm-thick binding layer 32 made of oriented polypropylene is arranged directly adjacent the chromium oxide layer. The chromium oxide layer is applied directly to the oPP layer by a CVD method and has a thickness of 10 nm to 100 nm. The adhesion between the chromium oxide layer and the OPP layer is surprisingly good such that the stability of the spacer with the moisture barrier is improved compared to the prior art. A multi-layer system having a barrier function 33 is arranged adjacent the binding layer 32. This multi-layer system includes one or more polymeric layers and one or more inorganic layers. The multi-layer system 33 is connected to the binding layer 32 on one side in any manner desired. This is, for example, possible via a bonding layer. The other side of the multi-layer system 33 is directed toward the outer wall 5 of the spacer. The multi-layer system 33 is attached to the hollow profile 1 via an adhesive, preferably a polyurethane hotmelt adhesive or an acrylate adhesive. As described in WO 2013/104507 A1, various barrier films from the prior art are suitable as the multi-layer system 33.

FIG. 3 depicts a cross-section through a moisture barrier 30 of a spacer I according to the invention. As already explained for FIG. 2, a multi-layer system 33 is arranged on the side facing the outer wall 5 of the spacer. It is advantageously attached to the outer wall via an adhesive. The multi-layer system 33 includes one or more polymeric layers 35 made, for example, of polyethylene or PET and one or more ceramic layers 34 made of SiOx, but no metallic layer. FIG. 3 depicts, by way of example, an embodiment in which a ceramic layer 34 of the multi-layer system 33 is arranged directly on the binding layer 32. In this example, the binding layer 32 is a 25-μm-thick oPET film. Such a thick oPET layer contributes, among other things, to improving the mechanical load-bearing capacity of the spacer I, in particular during bending of the spacer. On one side of the binding layer 32, a 30-nm-thick ceramic SiOx layer is arranged as an adhesive layer 31, which improves the adhesion to the secondary sealant. On the other side of the oPET film, a 30-nm-thick ceramic SiOx layer is likewise arranged. A moisture barrier constructed in this way can be produced particularly well since an oPET film coated on both sides with SiOx, which is easy to produce, can be arranged on the side of the moisture barrier 30 facing toward the outer interpane space. A further advantage of this structure is that the multi-layer system includes only ceramic layers and no metallic layers. As a result, the thermal conductivity is particularly low, further improving the heat insulating properties.

FIG. 4 depicts a cross-section through a moisture barrier 30 of a spacer I according to the invention. As the outer adhesive layer 31, a 30-nm-thick silicon oxide layer is applied to a roughly 20-μm-thick binding layer 32 made of OPP by a CVD process. A multi-layer system 33 having a barrier function 33 and consisting of three polymeric layers 35.1, 35.2, and 35.3 and three inorganic barrier layers 34.1, 34.2, and 34.3 is arranged adjacent thereto. The inorganic barrier layers are, in each case, 50-nm-thick aluminum layers. The polymeric layers 35.1 and 35.2 are, in each case, 12-μm-thick PET layers. The polymeric layer 35.3 is a 12-μm-thick LLDPE layer. The first polymeric layer 35.1 is connected directly to the first aluminum layer 34.1. The second polymeric layer 35.2 is connected directly to the second aluminum layer 34.2. The third polymeric layer 35.3 is connected directly to the third aluminum layer 34.3. A 3-μm-thick bonding layer made of a polyurethane adhesive is arranged between the binding layer 32 and the first aluminum layer 34.1. A bonding layer is likewise arranged between the second aluminum layer 34.2 and the first polymeric layer 35.1. A bonding layer is likewise arranged between the third aluminum layer 34.3 and the second polymeric layer 35.2. Thus, three binding layers are arranged in the entire stack of the moisture barrier 30. The moisture barrier can thus be produced by laminating four polymer films coated on one side: one oPP film coated on one side with two PET films coated on one side and one LLDPE film coated on one side. By orienting the third aluminum layer 34.3 to face the layer stack, the third aluminum layer 34.3 is protected against mechanical damage. The three thin aluminum layers ensure a high moisture density of the moisture barrier and thus of the spacer.

FIG. 5 depicts a cross-section of the edge region of an insulating glass unit II according to the invention with the spacer I shown in FIG. 1. The first pane 13 is connected to the first side wall 2.1 of the spacer I via a primary sealant 17, and the second pane 14 is attached to the second side wall 2.2 via the primary sealant 17. The primary sealant 17 is substantially a cross-linking polyisobutylene. The inner interpane space 15 is situated between the first pane 13 and the second pane 14 and is delimited by the glazing interior wall 3 of the spacer I according to the invention. The inner interpane space 15 is filled with air or with an inert gas such as argon. The cavity 8 is filled with a desiccant 11, for example, molecular sieve. The cavity 8 is connected to the inner interpane space 15 via perforations 24 in the glazing interior wall 3. A gas exchange between the cavity 8 and the inner interpane space 15 takes place through the perforations 24 in the glazing interior wall 3, with the desiccant 11 absorbing the atmospheric humidity out of the inner interpane space 15. The first pane 13 and the second pane 14 protrude beyond the side walls 2.1 and 2.2 creating an outer interpane space 16 that is situated between the first pane 13 and the second pane 14 and is delimited by the outer wall 5 with the moisture barrier 30 of the spacer. The edge of the first pane 13 and the edge of the second pane 14 are arranged at the same level. The outer interpane space 16 is filled with a secondary sealant 18. In the example, the secondary sealant 18 is a polysulfide. Polysulfides absorb the forces acting on the edge seal particularly well and thus contribute to high stability of the insulating glass unit II. The adhesion of polysulfides to the adhesive layer of the spacer according to the invention is excellent. The first pane 13 and the second pane 14 are made of soda lime glass having a thickness of 3 mm.

LIST OF REFERENCE CHARACTERS

I spacer
II insulating glass unit
1 hollow profile
2.1 first side wall
2.2 second side wall
3 glazing interior wall
5 outer wall
5.1, 5.2 the sections of the outer wall nearest the side walls
8 cavity
11 desiccant
13 first pane
14 second pane
15 inner interpane space
16 outer interpane space
17 primary sealant
18 secondary sealant
24 perforation in the glazing interior wall
30 moisture barrier
31 adhesive layer
32 binding layer
33 multi-layer system having a barrier function
34 inorganic barrier layer
35 polymeric layer

The invention claimed is:
1. A spacer for insulating glass units, comprising:
a polymeric hollow profile, comprising
a first side wall and a second side wall arranged parallel thereto, a glazing interior wall, which connects the first and second side walls to one another;
an outer wall, which is arranged substantially parallel to the glazing interior wall and connects the first and second side walls to one another;
a cavity, which is surrounded by the first and second side walls, the glazing interior wall, and the outer wall,
a moisture barrier on the first side wall, the outer wall, and the second side wall of the polymeric hollow profile, wherein the moisture barrier comprises
a multi-layer system having a barrier function comprising at least one polymeric layer and an inorganic barrier layer, a metallic or ceramic outer adhesive layer, wherein the metallic or ceramic outer adhesive layer has a thickness greater than 10 nm and less than 100 nm,
a binding layer arranged between the metallic or ceramic outer adhesive layer and the multi-layer system, the binding layer containing a polymer material selected from the group consisting of oriented polypropylene, oriented polyethylene terephthalate, biaxially oriented polypropylene, and biaxially oriented polyethylene terephthalate, wherein the binding layer is directly adjacent the metallic or ceramic outer adhesive layer,
wherein said at least one polymeric layer of the multi-layer system forms an external layer of the moisture barrier and faces outward toward the outer wall, and wherein said at least one polymeric layer of the multi-layer system is directly connected to the outer wall via an adhesive.

2. The spacer according to claim 1, wherein the metallic or ceramic outer adhesive layer is a ceramic adhesive layer and includes SiOx or is made of SiOx.

3. The spacer according to claim 1, wherein the metallic or ceramic outer adhesive layer is a metallic adhesive layer and includes or is made of aluminum, titanium, nickel, chromium, iron, alloys thereof and/or oxides thereof.

4. The spacer according to claim 3, wherein the metallic or ceramic outer adhesive layer is made substantially of a metal oxide.

5. The spacer according to claim 4, wherein the metal oxide is chromium oxide or titanium oxide.

6. The spacer according to claim 1, wherein the binding layer has a thickness of 5 μm to 35 μm.

7. The spacer according to claim 6, wherein the thickness is from 12 μm to 25 μm.

8. The spacer according to claim 1, wherein the metallic or ceramic outer adhesive layer is applied directly to the binding layer by chemical vapor deposition (CVD) or physical vapor deposition (PVD).

9. The spacer according to claim 1, wherein the metallic or ceramic outer adhesive layer has a thickness between 15 nm and 70 nm.

10. The spacer according to claim 9, wherein the metallic or ceramic outer adhesive layer has a thickness between 20 nm and 30 nm.

11. The spacer according to claim 1, wherein the multi-layer system having a barrier function includes at least two polymeric layers and at least two inorganic barrier layers.

12. The spacer according to claim 11, wherein the multi-layer system having a barrier function includes three polymeric layers and three inorganic barrier layers.

13. The spacer according to claim 1, wherein the multi-layer system having a barrier function contains exactly two or three polymeric layers and three inorganic barrier layers.

14. The spacer according to claim 1, wherein the multi-layer system having a barrier function includes at least one internal bonding layer having a thickness of 1 μm to 8 μm.

15. The spacer according to claim 14, wherein the at least one internal bonding layer has a thickness of 2 μm to 6 μm.

16. The spacer according to claim 1, wherein the multi-layer system having a barrier function includes, as inorganic barrier layers, exclusively ceramic barrier layers of SiOx and/or SiN.

17. The spacer according to claim 1, wherein the multi-layer system having a barrier function includes, as inorganic barrier layers, exclusively metallic barrier layers.

18. The spacer according to claim 17, wherein the metallic barrier layers are aluminum layers.

19. An insulating glass unit, comprising a first pane, a second pane, a spacer according to claim 1 arranged circumferentially between the first pane and the second pane, wherein
the first pane is attached to the first side wall via a primary sealant,
the second pane is attached to the second side wall via a primary sealant,
an inner interpane space is delimited by the glazing interior wall, the first pane, and the second pane,
an outer interpane space is delimited by the moisture barrier attached on the outer wall and the first pane and the second pane,
a secondary sealant is arranged in the outer interpane space, wherein the secondary sealant is in contact with the metallic or ceramic outer adhesive layer.

20. A method comprising manufacturing a building interior glazing, building exterior glazing, and/or façade glazing with the insulating glass unit according to claim 19.

21. The spacer according to claim 1, wherein the metallic or ceramic outer adhesive layer is made substantially of chromium oxide.

22. The spacer according to claim 1, wherein the polymer material of the binding layer is biaxially oriented polypropylene or biaxially oriented polyethylene terephthalate.

23. The spacer material according to claim 1, wherein each of the at least one polymeric layer of the multi-layer system contains a polymer material selected from the group consisting of polyethylene terephthalate, ethylene vinyl alcohol, oriented ethylene vinyl alcohol, polyvinylidene chloride, polyamides, polyethylene and polypropylene.

* * * * *